United States Patent
Hartmann et al.

(10) Patent No.: US 12,304,735 B2
(45) Date of Patent: May 20, 2025

(54) SINGLE TRACK MOBILE CARRIAGE SYSTEM

(71) Applicant: Pipp Mobile Storage Systems, Inc., Walker, MI (US)

(72) Inventors: Andrew B. Hartmann, Muskegon, MI (US); David E. Kowalski, Grandville, MI (US)

(73) Assignee: Pipp Mobile Storage Systems, Inc., Walker, MI (US)

( * ) Notice: Subject to any disclaimer, the term of this patent is extended or adjusted under 35 U.S.C. 154(b) by 874 days.

(21) Appl. No.: 17/495,874

(22) Filed: Oct. 7, 2021

(65) Prior Publication Data

US 2022/0106118 A1    Apr. 7, 2022

Related U.S. Application Data

(60) Provisional application No. 63/088,537, filed on Oct. 7, 2020.

(51) Int. Cl.
  *B65G 1/10*    (2006.01)
  *A47B 53/02*   (2006.01)
  *B65G 1/137*   (2006.01)

(52) U.S. Cl.
  CPC ............... *B65G 1/10* (2013.01); *A47B 53/02* (2013.01); *B65G 1/1378* (2013.01); *B65G 2812/02306* (2013.01)

(58) Field of Classification Search
  CPC . B65G 1/10; B65G 1/026; B65G 1/04; B65G 1/1378; B65G 2812/02306; A47B 53/02
  See application file for complete search history.

(56) References Cited

U.S. PATENT DOCUMENTS

| | | |
|---|---|---|
| 2,166,704 A | 7/1939 | Foulkes |
| 2,772,639 A | 12/1956 | Hans |
| 2,812,069 A * | 11/1957 | Trammell ............... A47B 53/02 211/175 |
| 2,915,195 A | 12/1959 | Crosby |
| 3,047,095 A | 7/1962 | Bell et al. |
| 3,198,592 A | 8/1965 | Zippel |

(Continued)

FOREIGN PATENT DOCUMENTS

KR    20150043190 A  *  4/2015

OTHER PUBLICATIONS

"LINK51 Trackless Mobile Shelving," available at https://www.link51.com/shelving/mobile-shelving/trackless-mobile-shelving, downloaded Aug. 6, 2020.

*Primary Examiner* — Zachary L Kuhfuss
*Assistant Examiner* — Cheng Lin
(74) *Attorney, Agent, or Firm* — Gardner, Linn, Burkhart & Ondersma LLP

(57) ABSTRACT

A mobile carriage system includes a frame supported by a surface, a drive shaft that extends along the frame and drives a drive wheel to move the frame along the surface, and a guide track that extends along the surface and has an elevated track portion. The drive wheel supports the frame and rolls along the surface, and a guide wheel rides along the elevated track portion. The drive wheel is fixedly secured onto the drive shaft and is rotatable by the drive shaft. The guide wheel is also mounted onto the drive shaft but is freely rotatable on the drive shaft, with the drive wheel having a smaller diameter than the drive wheel.

20 Claims, 6 Drawing Sheets

(56) References Cited

U.S. PATENT DOCUMENTS

| | | | | |
|---|---|---|---|---|
| 3,351,023 | A | * | 11/1967 | Fava .................. B65G 1/06 |
| | | | | 198/804 |
| 3,427,085 | A | | 2/1969 | Staller |
| 3,563,180 | A | * | 2/1971 | Rutledge ................. B65G 1/10 |
| | | | | 104/288 |
| 3,640,595 | A | | 2/1972 | Staller et al. |
| 3,865,446 | A | | 2/1975 | Mastronardi |
| 3,923,354 | A | | 12/1975 | Young |
| 3,944,309 | A | | 3/1976 | Taniwaki |
| 3,967,868 | A | | 7/1976 | Baker, Jr. |
| 4,017,131 | A | | 4/1977 | Camenisch |
| 4,229,135 | A | | 10/1980 | Malmros |
| 4,256,355 | A | | 3/1981 | Yamaguchi et al. |
| 4,307,922 | A | | 12/1981 | Rhodes, Jr. |
| 4,379,602 | A | | 4/1983 | Iemura et al. |
| 4,412,772 | A | | 11/1983 | Naito et al. |
| 4,417,524 | A | * | 11/1983 | Quinn .................. A47B 53/02 |
| | | | | 295/36.1 |
| 4,462,500 | A | | 7/1984 | Konstant et al. |
| 4,597,615 | A | | 7/1986 | Steger |
| 4,618,191 | A | | 10/1986 | Peterman |
| 4,708,411 | A | * | 11/1987 | Peterman ............... A47B 53/02 |
| | | | | 104/251 |
| 4,789,210 | A | | 12/1988 | Weiss et al. |
| 4,802,622 | A | | 2/1989 | Homan |
| 5,004,304 | A | | 4/1991 | Segerpalm et al. |
| 5,013,101 | A | | 5/1991 | Muth |
| 5,069,513 | A | | 12/1991 | Farrell et al. |
| 5,072,838 | A | | 12/1991 | Price, Jr. et al. |
| 5,160,189 | A | | 11/1992 | Johnston et al. |
| 5,265,739 | A | | 11/1993 | Price, Jr. et al. |
| 5,341,944 | A | | 8/1994 | Latino |
| 5,360,262 | A | | 11/1994 | Davidian |
| 5,366,335 | A | | 11/1994 | Tokiwa |
| 5,435,639 | A | | 7/1995 | Smits et al. |
| 5,439,281 | A | * | 8/1995 | Croker .................. A47B 53/02 |
| | | | | 312/201 |
| 5,597,217 | A | * | 1/1997 | Hoska .................... A47B 53/02 |
| | | | | 104/248 |
| 5,683,155 | A | | 11/1997 | Sarno |
| 6,112,917 | A | | 9/2000 | Baker et al. |
| 6,158,601 | A | | 12/2000 | Baker et al. |
| 7,950,331 | B2 | * | 5/2011 | Tourdot ............... A47B 53/02 |
| | | | | 104/106 |
| 11,420,822 | B2 | * | 8/2022 | Fjeldheim .............. B66C 1/101 |
| 11,478,079 | B2 | | 10/2022 | French et al. |

* cited by examiner

SINGLE TRACK MOBILE CARRIAGE SYSTEM

CROSS REFERENCE TO RELATED APPLICATION

The present application claims priority of U.S. provisional application Ser. No. 63/088,537 filed Oct. 7, 2020, which is hereby incorporated by reference herein in its entirety.

FIELD OF THE INVENTION

The present invention relates generally to mobile storage systems and, more particularly, to a single track mobile storage system.

BACKGROUND OF THE INVENTION

Many different types of mobile storage assemblies, such as mobile storage racks, carriages or platforms, are mounted atop wheels or rollers that provide support for and facilitate a guided movement of the storage assemblies, typically along two or more spaced apart tracks that extend along a support surface, such as a concrete floor. However, multiple tracks for such mobile storage assemblies require additional costs associated with installation and maintenance of the multiple tracks. Also, multiple tracks positioned on a floor increase a tripping hazard for people and create additional obstructions for carts, dollies, or rolling ladders often used around such storage assemblies in a storage facility, warehouse or manufacturing environment.

SUMMARY OF THE INVENTION

The present invention provides a guided mobile carriage system that has only a single guide track extending along a support surface, such as a floor. The guided system includes a frame that is driven by a drive shaft and is laterally movable along the support surface and the single guide track. The frame is supported by a drive wheel that rolls along the support surface and is fixedly mounted onto the drive shaft so as to rotate only with the drive shaft. The frame is guided by a guide wheel that rides along an elevated portion of the guide track and is mounted onto the drive shaft in a freely rotatable manner. Since the guide wheel rides on the elevated portion of the guide track, the guide wheel has a smaller diameter than a diameter of the drive wheel, which allows the frame to remain parallel to the support surface. Meanwhile, the guide wheel is freely-floating on the drive shaft, allowing the guide wheel to rotate, albeit at a faster rotational speed than the drive wheel, at the identical linear pace with the drive wheel and frame as the frame moves along the support surface.

According to one form of the present invention, a mobile carriage system includes a frame, a drive shaft, an elongate guide track, a drive wheel, and a guide wheel. The frame is supportable at a surface, while the elongate guide track is mountable to the surface and has a track portion set at a different elevation than that of the support surface. The drive shaft extends at least partially along the frame. The drive wheel and guide wheel have different diameters, with the drive wheel configured to support the frame and roll along the surface. The drive wheel is fixedly secured onto and rotatably driven by the drive shaft. The guide wheel rides along the track portion as the drive wheel rolls along the floor. Because of the different wheel diameters and elevations, the guide wheel rotates at a different rotational speed than the drive wheel as the drive wheel rolls along the surface and the guide wheel rides along the track portion.

According to another form of the present invention, a mobile carriage system includes a frame supported by a surface, a drive shaft extending along the frame and fitted with a drive wheel that drives the frame along the surface, a guide track extending along the surface and having an elevated track portion, and a guide wheel that rides along the elevated track portion. The drive wheel supports the frame and rolls along the surface, and is fixedly secured onto the drive shaft and is rotatable by the drive shaft. The guide wheel has a smaller diameter than a diameter of the drive wheel, and the guide wheel is mounted onto the drive shaft and is freely rotatable on the drive shaft.

In one aspect, the drive wheel includes a keyway configured to receive a key to fixedly secure the drive wheel onto the drive shaft such that the drive wheel is rotatable only with the drive shaft.

In another aspect, the drive wheel is spaced apart from the guide wheel.

In yet another aspect, the elevated track portion includes a rail disposed within and extending along the guide track.

In a further aspect, the guide wheel includes a pair of radially extending flanges defining a groove therebetween. The groove is configured to fit over and ride along the rail.

In yet a further aspect, the guide wheel is mounted at one end of the drive shaft, and the drive wheel is mounted on the drive shaft away from the guide wheel and towards an opposing end portion of the drive shaft.

In still a further aspect, the mobile carriage system further includes a drive system operable to rotatably drive the drive shaft. The drive system is disposed at and connected to the opposing end of the drive shaft.

In yet another aspect, the frame includes a channel member with the drive shaft extending therethrough. The guide wheel is mounted inside the channel member, and the drive wheel is mounted outside the channel member.

In another aspect, there is an elongate retainer tab extending along the guide track, adjacent the elevated track portion. The elongate retainer tab defines a retainer groove, which receives a tongue bracket that is coupled to the guide wheel. The tongue bracket is received in the retainer groove and traverses along the retainer groove as the guide wheel rides along the elevated track portion. The retainer tab and tongue bracket cooperate to prevent the guide wheel from derailing, such as due to seismic activity, unusual loads applied to the carriage or frame, or track contamination.

According to another form of the present invention, a mobile carriage system includes a longitudinally extended frame supportable on a surface and adapted to laterally move along the surface, a drive shaft that drives the frame along the surface and longitudinally extends along the frame, a guide track laterally extending along the surface and having an elevated track portion that includes a rail disposed within and extending along the guide track, a drive wheel that supports the frame and rolls along the surface, and a guide wheel that laterally rides along the elevated track portion. The drive wheel is fixedly secured onto the drive shaft and rotatable by the drive shaft. The guide wheel includes a pair of radially extending flanges defining a groove therebetween. The groove is configured to fit over and ride along the rail disposed within and extending along the guide track. The guide wheel has a smaller diameter than the drive wheel, and the guide wheel is mounted onto the drive shaft and is freely rotatable on the drive shaft.

In one aspect, the mobile carriage system further includes a drive system operable to rotatably drive the drive shaft.

In another aspect, the drive system is disposed at and connected to one end of the drive shaft, the guide wheel is mounted at an opposing end of the drive shaft, and the drive wheel is mounted between the guide wheel and the drive system.

Thus, the present invention provides a mobile carriage system that includes a frame that is laterally driven along a support surface by a drive shaft linking a drive wheel and a guide wheel mounted thereon, and is guided only by a single guide track positioned along the support surface, which reduces the costs associated with installation and maintenance of multiple guide tracks and reduces obstacles on the support surface. For example, the single guide track may be placed along a relatively unobtrusive or out-of-the-way location along the support surface, such as near an upright wall or spaced far from common walking areas. The drive wheel that supports the frame is locked to rotate with the drive shaft, while the guide wheel is free-floating and has a smaller diameter than the drive wheel preventing the guide wheel from sliding or dragging while keeping up with the drive wheel.

These and other objects, advantages, purposes and features of the present invention will become apparent upon review of the following specification in conjunction with the drawings.

DESCRIPTION OF THE PREFERRED EMBODIMENTS

Figure 1:
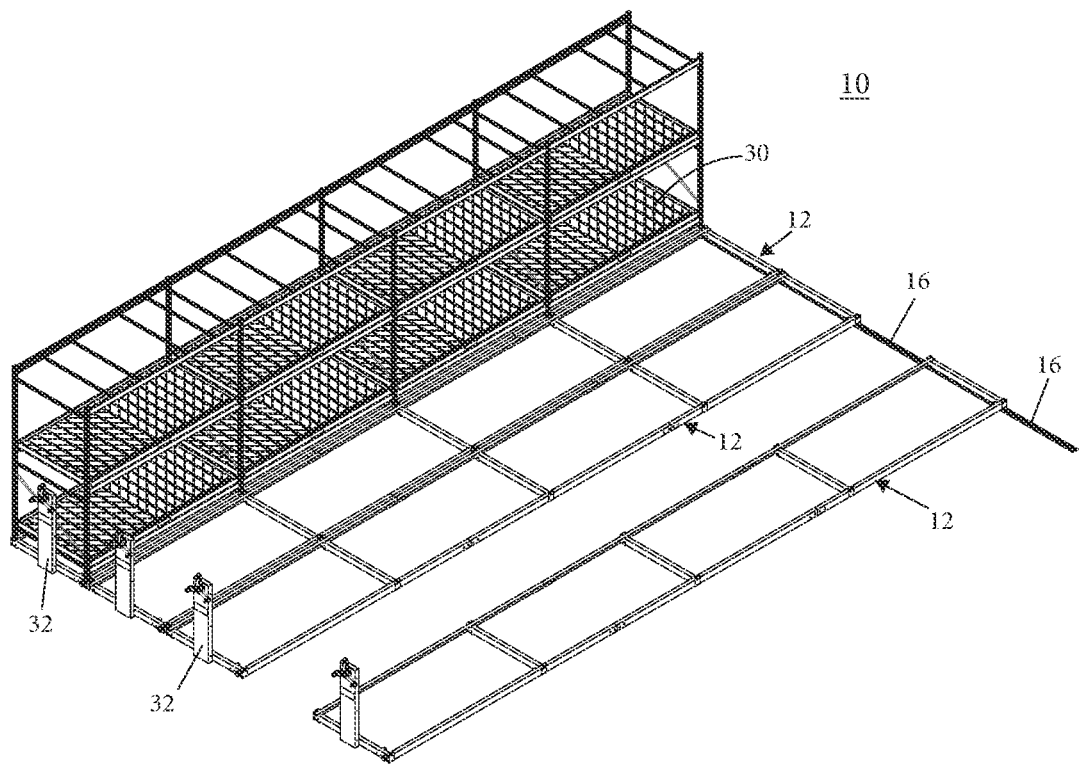
FIG. 1 is a perspective view of a guided mobile carriage system in accordance with the present invention, shown with a plurality of mobile frames.

Referring now to the drawings and the illustrative embodiments depicted therein, a guided mobile carriage system 10 (FIGS. 1 and 2) includes one or more frame assemblies 12 for supporting articles stored thereon. Mobile carriage system 10 provides for efficient floor space utilization in a storage, warehouse, plant growing or manufacturing facility. To provide such efficiency, each of the one or more frame assemblies 12 is configured to laterally move along a support surface creating available space, while being guided by only a single guide track, which provides for cost savings associated with installation and maintenance of multiple tracks and reduction of obstacles along the support surface. Each frame assembly 12 includes a drive shaft 14 (FIG. 3) for driving each frame assembly 12 along a floor or other support surface. A single guide track 16 (FIGS. 1-3) guides the frame assemblies 12 along the floor. On the drive shaft 14 there is mounted a distal drive wheel 18e (FIGS. 3 and 4) for supporting frame assembly 12 and rolling along the floor, and a guide wheel 20 (FIGS. 4-6) for riding along guide track 16 as frame assembly 12 moves along the floor. The mobile carriage system 10 may include an anti-tip or anti-dislodge feature to prevent the frame assemblies 12 from tipping over or otherwise dislodging from the guide track 16.

Figure 2:
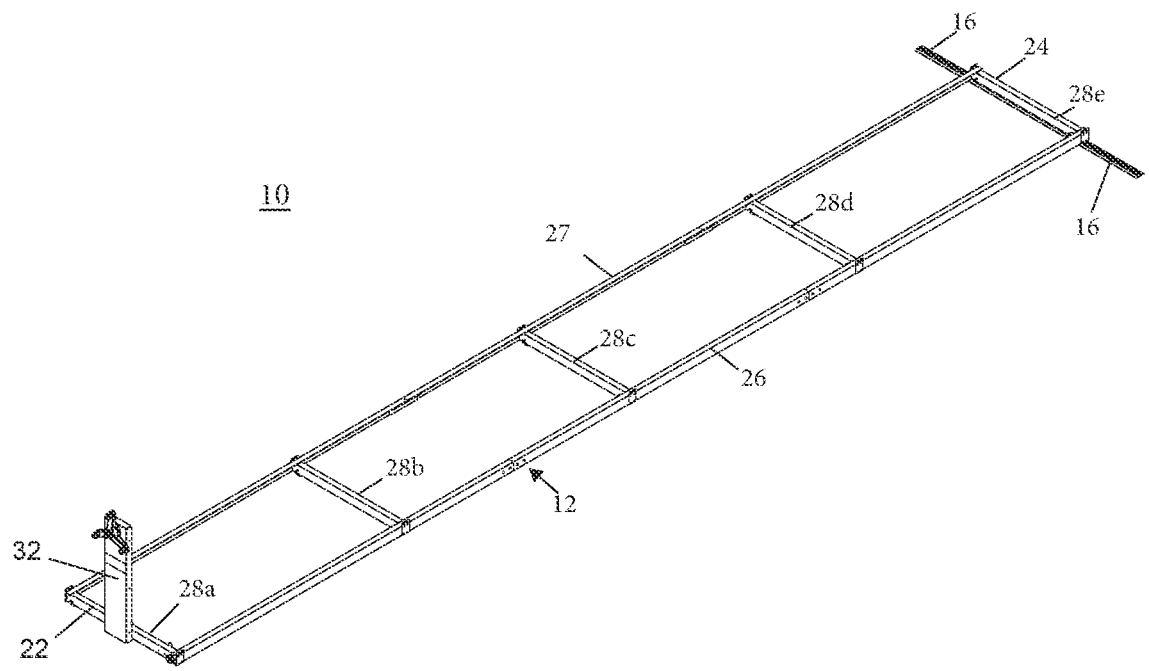
FIG. 2 is an enlarged perspective view of one of the plurality of mobile frames of FIG. 1.

Turning to FIG. 2, frame assembly 12 has a proximal end 22 and a distal end 24 and is formed by a pair of longitudinally extending and generally parallel primary and secondary beams 26, 27 that are inter-connected by spaced-apart cross-bars 28a-e, which are parallel to one another and transversely extend between primary and secondary beams 26, 27. It should be understood that a first or proximal cross-bar 28a is disposed at the proximal end 22, while a fifth or distal cross-bar 28e is disposed at the distal end 24 of frame assembly 12, with a second cross-bar 28b, third cross-bar 28c, and fourth cross-bar 28d spaced in between. It should also be appreciated that frame assembly 12 may have a modular construction, and thus may be longitudinally shortened or extended, as desired, and that the aspects of the present disclosure, discussed in detail below, are equally applicable to an extended or shortened version of frame assembly 12. The frame 12 may be fitted with various desired structures such as a support rack 30 with vertically-spaced shelves such as shown in FIG. 1, and/or other structures such as platforms or bins. Frame assembly 12 further includes a user-operated drive system 32 connected to first cross-bar 28a disposed at the proximal end 22 of frame assembly 12, such as shown in FIGS. 1 and 2. Drive system 32 can be manual or powered and is operable to selectively rotate drive shaft 14, which will be described in more detail below.

Figure 3:
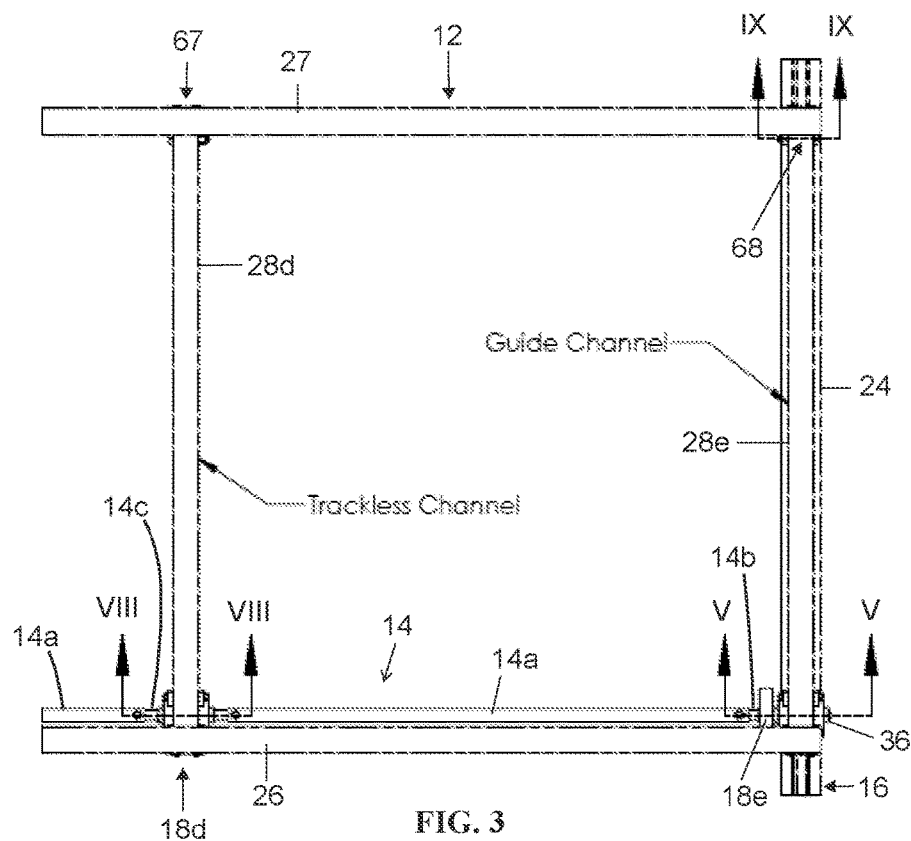
FIG. 3 is a top plan view of a distal portion of one of the mobile frames of FIG. 1.
Figure 4:
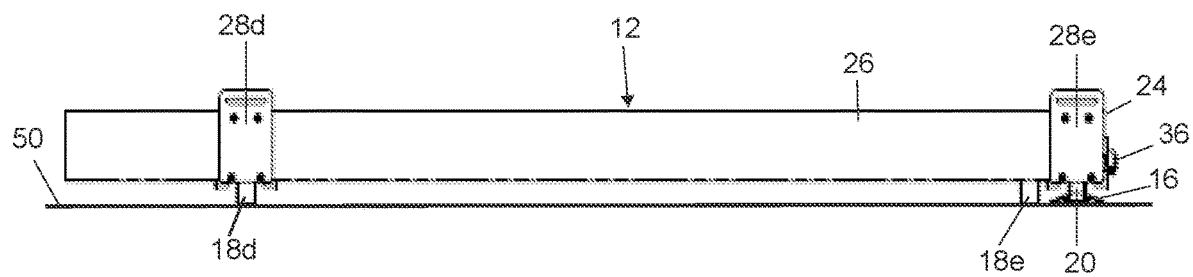
FIG. 4 is a side elevation view of the mobile frame portion of FIG. 3.
Figure 5:
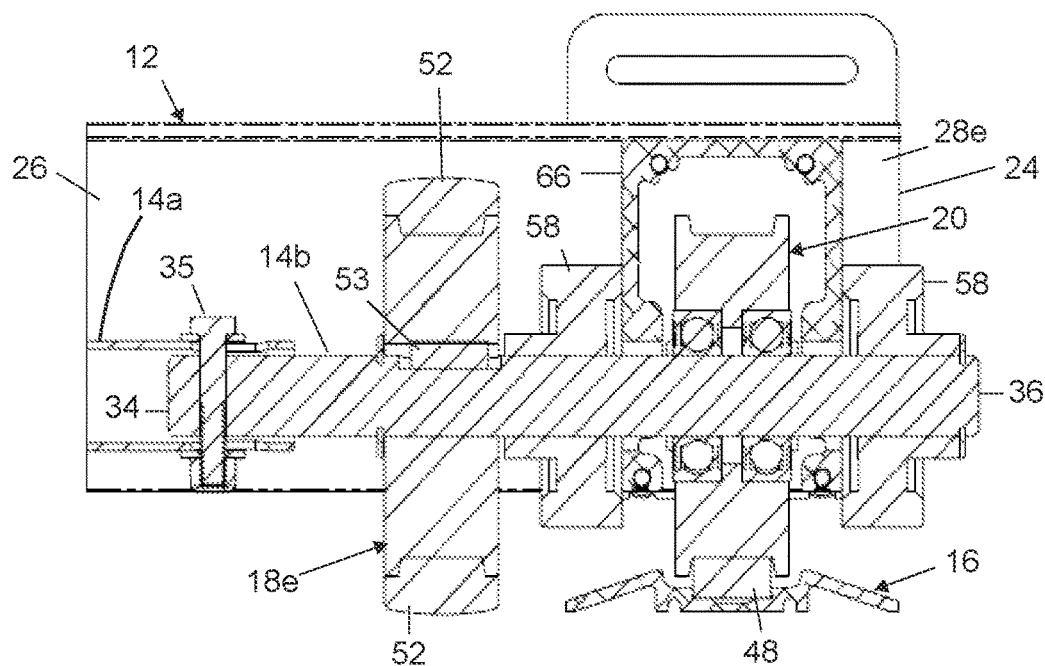
FIG. 5 is a sectional view of the region taken along the line V-V in FIG. 3.
Figure 6:
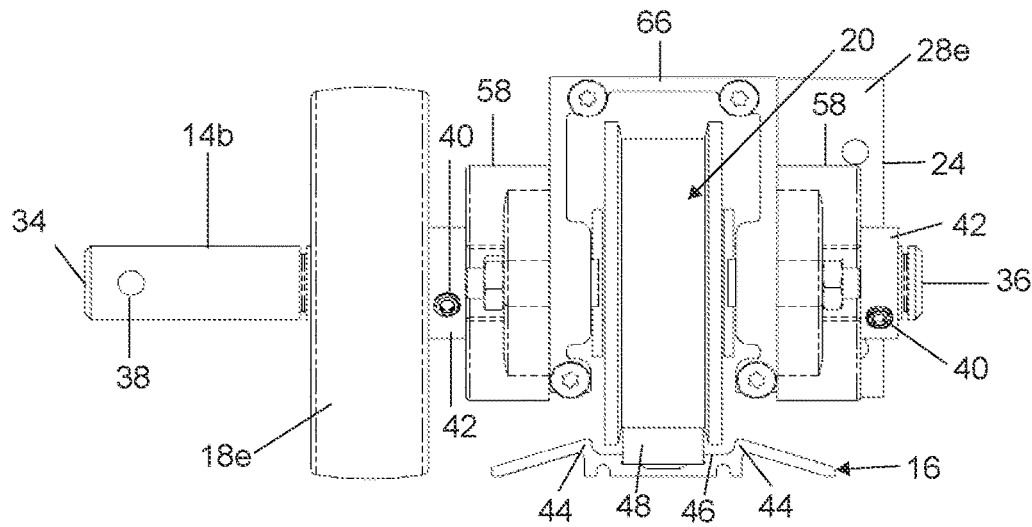
FIG. 6 is a front elevation view of a drive wheel with guide wheel arrangement in accordance with the present invention.
Figure 7:
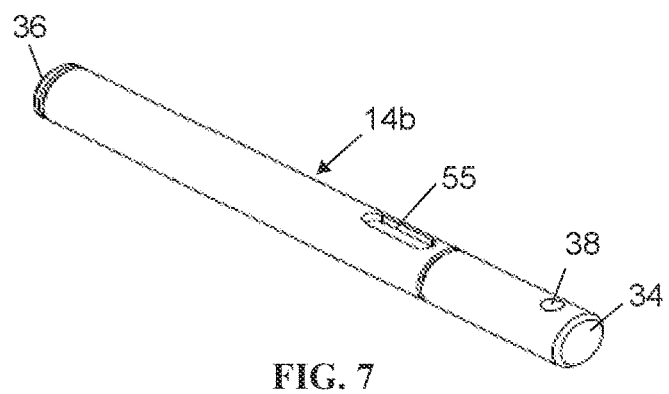
FIG. 7 is a perspective view of a distal end portion of a drive shaft of the mobile carriage system.

With reference to FIGS. 3 and 4, the distal portion of frame assembly 12 is formed by distal end portions of primary and secondary beams 26, 27 being inter-connected by the fourth cross-bar 28d and fifth cross bar 28e. Drive shaft 14 extends along the primary beam 26 and is rotatable to drive frame assembly 12 along a floor. Drive shaft 14 includes a plurality of elongate transmission shafts 14a coupled to and extending between a distal wheel-mount portion 14b and intermediate wheel-mount portions 14c. Drive shaft 14 extends along an entire longitudinal extent of frame assembly 12. One of the intermediate wheel-mount portions 14c near the proximal end of the drive shaft 14 is rotatably coupled to drive system 32 secured at first cross-bar 28a, while the wheel-mount portion 14b at the distal end the drive shaft 14 terminates at the distal cross-bar 28e. The distal wheel-mount portion 14b includes a connecting end 34 and a headed end 36 (FIGS. 6 and 7). As best shown in FIGS. 5 and 6, the distal wheel-mount portion 14b is coupled to one of the transmission shafts 14a by a fastener 35 inserted through an opening 38 (FIGS. 6 and 7) formed near connecting end 34 of distal wheel-mount portion 14b. The headed end 36 of distal wheel-mount portion 14b is rotatably secured to the distal cross-bar member 28e by a retaining collar 42 that is secured by a rivet, pin or screw 40, such as shown in FIG. 6, although other fastening arrangements are also envisioned.

Figure 10:
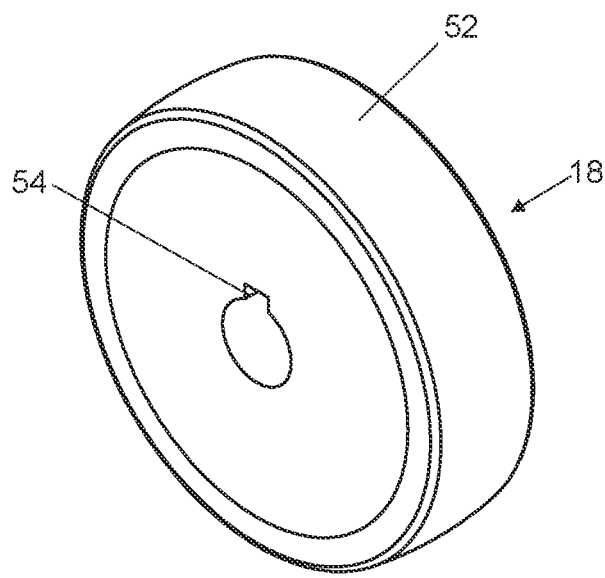
FIG. 10 is a perspective view of a drive wheel of the mobile carriage system.

Turning now to FIGS. 5 and 6, distal drive wheel 18e is mounted onto the distal wheel-mount portion 14b of drive shaft 14, and is used to support the distal portion of frame 12 above floor 50 and laterally roll along floor 50. Distal drive wheel 18e includes an annular core with a urethane or polyurethane overmold 52 (FIG. 10) to enhance traction of distal drive wheel 18e over floor 50. Distal drive wheel 18e further includes a keyway 54 (FIG. 10) configured to receive a key 53 (FIG. 5) for engagement with aperture 55 (FIG. 7) formed in the distal wheel-mount portion 14b of drive shaft 14. As such, distal drive wheel 18e is fixedly secured onto distal wheel-mount portion 14b of drive shaft 14 and is rotatable only with the transmission shafts 14a, the distal-wheel-mount portion 14b, and the intermediate wheel-mount portions 14c of the drive shaft 14. As best shown in FIG. 4, distal drive wheel 18e is disposed at the distal end 24 of frame 12, and is positioned proximally of the distal cross-bar 28e in the direction of the fourth cross-bar 28d.

Figure 8:
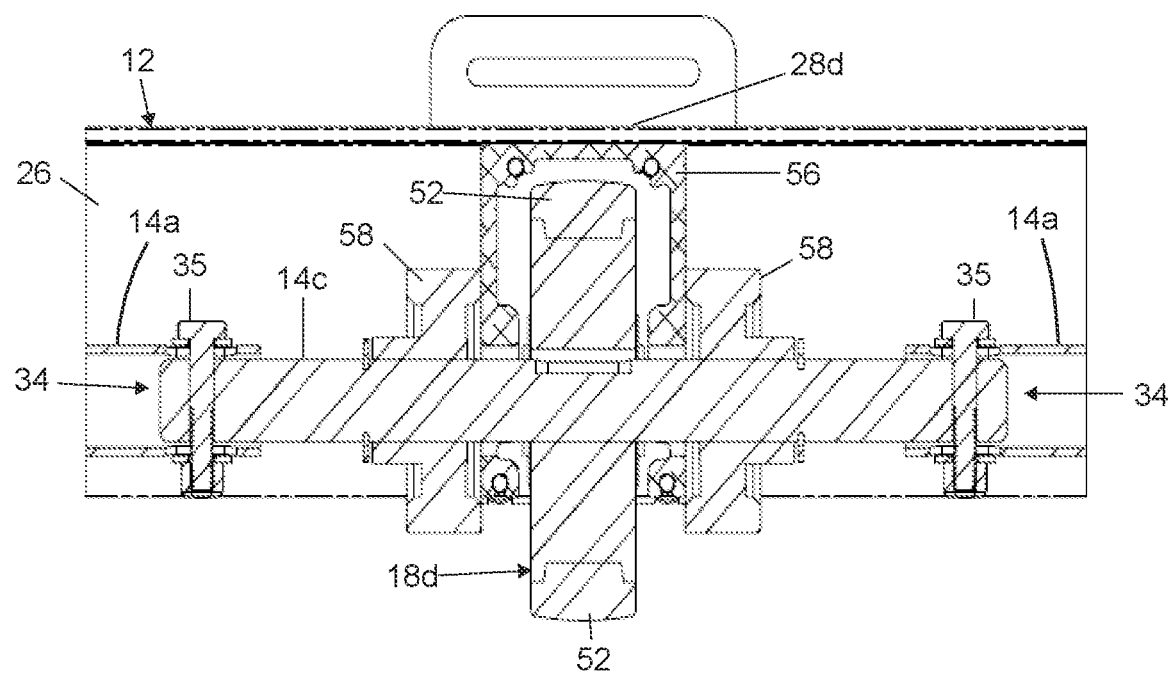
FIG. 8 is a sectional view of the region taken along the line VIII-VIII in FIG. 3.

In the illustrated embodiments of FIGS. 3 and 4, the distal portion of frame 12 is further supported by an intermediate drive wheel 18d longitudinally spaced from the distal drive wheel 18e and positioned along primary beam 26. This intermediate drive wheel 18d is at least partially positioned under and/or within the fourth cross-bar 28d. With reference to FIG. 8, drive shaft 14 further includes an intermediate wheel-mount portion 14c, both ends of which securely coupled with respective transmission shafts 14a by respective fasteners 35. As such, the intermediate wheel-mount portion 14c may be thought of as a double-ended version of the distal wheel-mount portion 14b, with two connecting ends 34 instead of one connecting end 34 and one headed end 36 of the distal wheel-mount portion 14b. Intermediate drive wheel 18d is mounted onto the intermediate wheel mount portion 14c and laterally rolls along floor 50 in the same manner as distal drive wheel 18e. Intermediate drive wheel 18d is substantially similar to distal drive wheel 18e, and is fixedly secured onto intermediate wheel mount portion 14c in the manner described above with respect to the securement of distal drive wheel 18e to the distal wheel-mount portion 14b, such that intermediate drive wheel 18d is rotatable only with drive shaft 14. As best shown in FIG. 8, intermediate drive wheel 18d is disposed within an inverted U-shaped bracket 56 that provides additional structural support for frame 12. A pair of disks 58 are mounted along the intermediate wheel mount portion 14c, with each disk 58 being disposed at an exterior surface of a respective vertical side of bracket 56. Each disk 58 is securely abutted to the respective vertical side of bracket 56 by a respective retaining collar 42. Intermediate wheel mount portion 14c extends through the vertical sides of bracket 56 and the pair of disks 58, with each end of the intermediate wheel mount portion 14c terminating at a respective connecting end 34.

As illustrated in FIGS. 1, 2 and 6, guide track 16 is an elongated track made from continuous length of steel, aluminum alloy, hard or reinforced plastic, or the like. Guide track 16 includes a pair of side walls 44 extending along the length of the track and a recess 46 extending between the side walls 44, such as shown in FIG. 6. An elongated strip or a rail 48 extends along the length of recess 46, with an upper portion of the rail 48 rising above the side walls 44. It is envisioned that rail 48 is replaceable within recess 46, such as due to wear or damage. Guide track 16 is laterally oriented and fixedly secured to a floor 50, or other substantially flat support surface, such as shown in FIG. 4. It will be understood that guide track 16 is the only track that is used to laterally guide frame 12 across floor 50, thereby eliminating additional obstructions along the floor associated with having multiple tracks.

Figure 11:
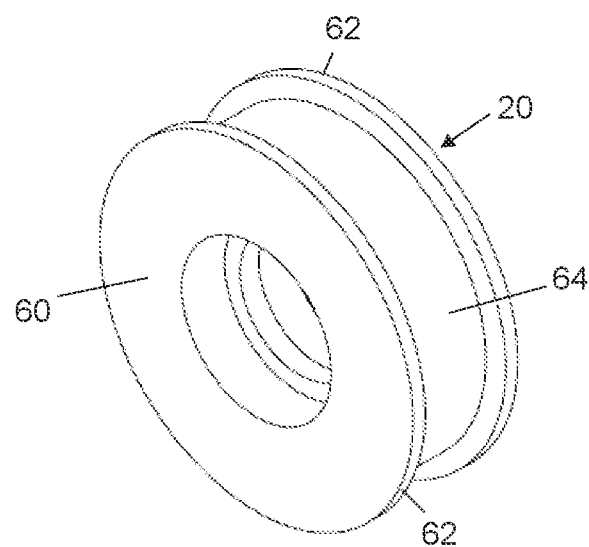
FIG. 11 is a perspective view of a guide wheel of the mobile carriage system.

With reference now to FIGS. 4-6, guide wheel 20 is used to laterally guide frame 12 as frame 12 moves along floor 50. Guide wheel 20 is mounted onto the distal wheel-mount portion 14b of drive shaft 14 and is adapted to ride along guide track 16 as frame 12 moves along floor 50. As shown in FIG. 11, guide wheel 20 includes an annular core 60 with a pair of annular radially-extending flanges 62 defining an annular groove 64 therebetween. Groove 64 is configured to fit over rail 48 of guide track 16 to securely ride along guide track 16 without sliding and with minimal friction. To compensate for guide wheel 20 riding on an elevated portion of guide track 16, guide wheel 20 has a diameter (at the groove 64) that is smaller than that of drive wheels 18d and 18e, which allows frame 12 to remain generally parallel to floor 50. Moreover, guide wheel 20 is free-floating or freely rotatable on drive shaft 14, which allows the smaller diameter guide wheel 20 to rotate at a faster rotational speed than drive wheels 18d, 18e, and thus maintain the same linear pace with drive wheels 18d, 18e. If guide wheel 20 were fixedly secured onto drive shaft 14, the smaller-diameter guide wheel 20 would need to frictionally slide along the rail 48 in order to maintain the same linear pace as the larger-diameter drive wheels 18d, 18e.

As shown in FIGS. 5 and 6, guide wheel 20 is disposed at the distal end 24 of frame 12, and is at least partially positioned within distal cross-bar 28e. Guide wheel 20 is positioned away from the distal drive wheel 18e and towards the distal end 24 of frame 12, with distal drive wheel 18e and guide wheel 20 being spaced apart from each other. Guide wheel 20 is disposed within an inverted U-shaped channel 66 that provides additional structural support for frame 12. A pair of disks 58 are mounted along the distal wheel mount portion 14b, with each disk 58 being disposed at an exterior surface of a respective vertical side of channel 66. One of the disks 58 is positioned at the frame's distal end 24 and securely abutted to one of the vertical sides of channel 66 by the retaining collar 42, while the other disk 58 is securely abutted to the other vertical side of channel 66 by another retaining collar 42. Both retaining collars 42 are secured by respective rivet, pin or screw 40, such as shown in FIG. 6. The distal wheel-mount portion 14b of drive shaft 14 extends through the vertical sides of channel 66, guide wheel 20, the pair of retaining collars 42, and the pair of disks 58.

Figure 9:
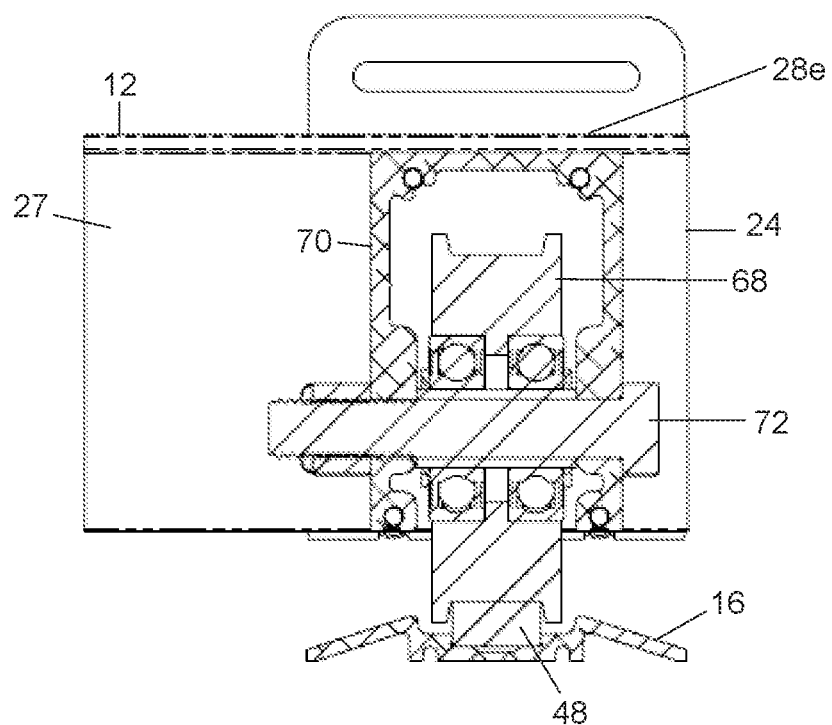
FIG. 9 is a sectional view of the region taken along the line IX-IX in FIG. 3.

With reference to FIG. 3, the distal portion of frame 12 is further supported by an idler wheel 67 and guided by an additional guide wheel 68 (FIG. 9). The idler wheel 67 and additional guide wheel 68 are disposed along and rotatably mounted to secondary beam 27 of frame 12. Idler wheel 67, which provides support along the secondary beam 27 of frame 12, is similar to drive wheel 18d described above, except that the idler wheel does not have a keyway, is not mounted onto a drive shaft, and is freely rotatable relative to the secondary beam 27. Idler wheel 67 is at least partially positioned within fourth cross-bar 28d of frame 12 and is generally parallel to and in-line with intermediate drive wheel 18d. Similar to the intermediate drive wheel 18d described above, idler wheel 67 may be disposed within an inverted U-shaped bracket with a disk along each exterior surface of each vertical side of the bracket. It will be appreciated that the first through third cross-bars 28a-c may contain additional drive and idler wheels that are identical to and arranged similarly as drive wheel 18d and idler wheel 67 within the fourth cross-bar 28d.

As best shown in FIG. 9, additional guide wheel 68 also provides support for the distal portion of frame 12, and is substantially similar to guide wheel 20 described above except that additional guide wheel 68 is not mounted onto a drive shaft. Additional guide wheel 68 is at least partially positioned within the distal cross-bar 28e of frame 12, and also rides along the guide track rail 48. Additional guide wheel 68 is disposed within an additional inverted U-shaped channel 70 that provides additional structural support for frame 12. Additional guide wheel 68 is rotatably secured to secondary beam 27 of frame 12 by a bolt 72 extending through vertical sides of additional channel 70.

Figure 12:
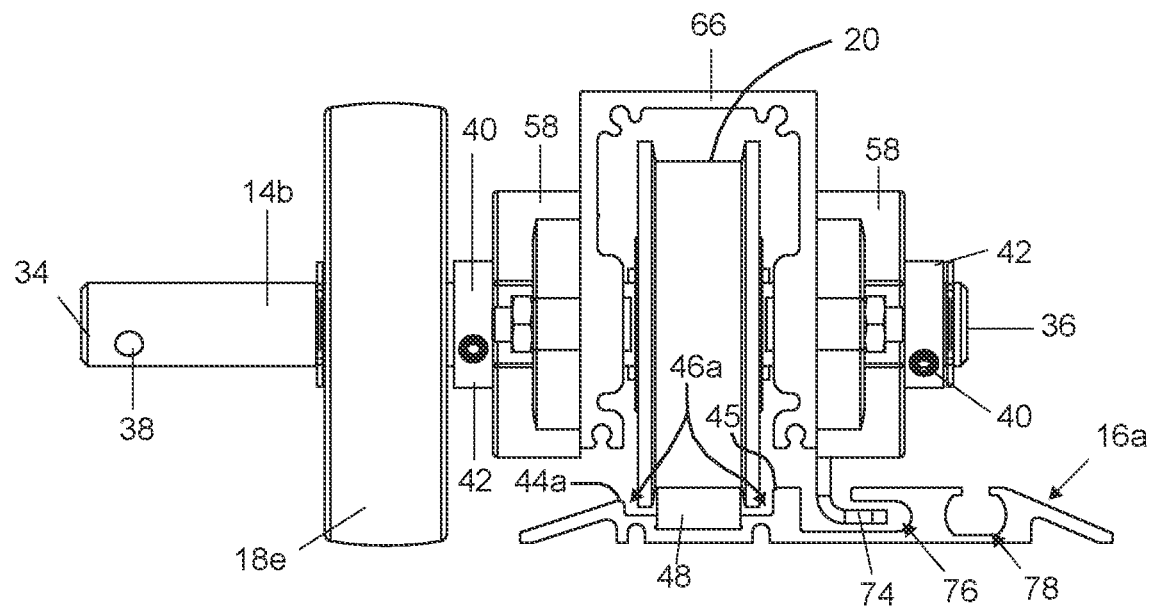
FIG. 12 is a front elevation view of another drive wheel with a guide wheel and retainer arrangement with anti-tip feature, in accordance with the present invention.
Figure 13:
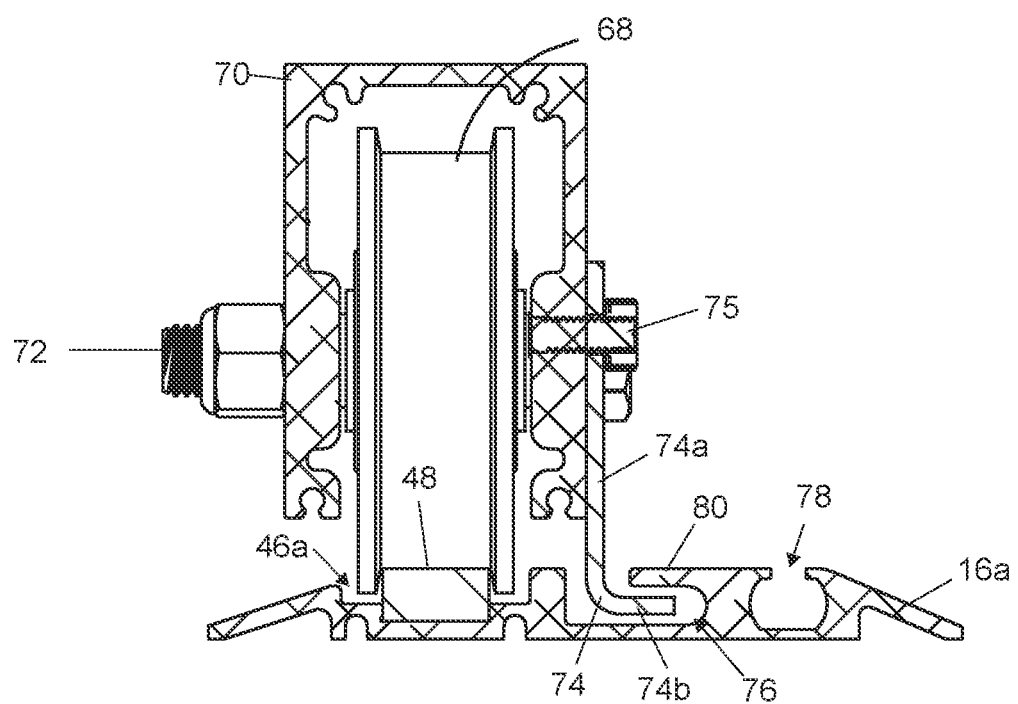
FIG. 13 is another front elevation view of another guide wheel and retainer arrangement with anti-tip feature.

Referring to the illustrative embodiment of FIGS. 12 and 13, an extended single guide track 16a is provided for the guided mobile carriage system 10. Guide track 16a includes a first side wall 44a and a second side wall 45 extending along the length of the track, and defining a recess 46a between the side walls 44a and 45. An elongated strip or a rail 48 extends along the length of recess 46a, with an upper portion of the rail 48 rising above the first side wall 44a and approximately even with a top of second side wall 45. A retainer arrangement, in the form of an angled tongue bracket 74 and a groove 76, is provided with the guide wheels 20, 68 and channels 66, 70 to provide an anti-tip/anti-dislodge function or feature to the guided mobile carriage system 10. As best shown in FIG. 13, the tongue bracket 74 includes an upright arm 74a that is fixed to a vertical side of the channel 70 and extends downward from the channel 70. The upright arm 74a is fixed to the channel 70 with a bolt 75. A lower horizontal arm 74b extends perpendicularly from the lower end of the upright arm 74a, away from the guide wheel 68. The extended track 16a includes an auxiliary recess 78 adjacent groove 76 for receiving an auxiliary accessory, such as a debris skirt (not shown).

When the frame assembly 12 is installed on the extended track 16a, a lower portion of tongue bracket 74, including the horizontal arm 74b, extend below an upper surface of the extended track 16a, with the horizontal arm 74b received in a portion of the groove 76. The groove 76 is formed in a portion of extended single guide track 16a adjacent the rail 48. The groove 76 extends parallel to the rail 48 and includes a retainer tab 80 that extends over and covers a portion of the horizontal arm 74b when the tongue bracket 74 is engaged in the groove 76. The groove 76 is shaped and dimensioned to receive the lower portion of the tongue bracket such that the bracket 74 is unable to disengage laterally or vertically from the groove 76 while permitting the tongue bracket 74 to move substantially freely along the longitudinal axis of the groove, parallel to the rail 48. In other words, the tongue bracket 74 may only be removed from one of the longitudinal ends of the groove 76. As such, the retainer tab 80 and horizontal arm 74b cooperate to ensure that the guide wheel 68 cannot dislodge or disengage from the rail 48. The retainer tab 80 and horizontal arm 74b may also prevent the frame assembly 12 from tipping or toppling over. It will be appreciated that extended track 16a may be used in place of the single guide track 16 depicted in FIGS. 1-6 and 9 to provide an anti-tip/anti-dislodge function to the guided mobile carriage system 10. The extended track 16a and retainer arrangement (i.e. tongue 74 and groove 76) may be particularly beneficial in regions with seismic activity, to prevent the mobile carriage system 10 from dislodging or disengaging from the rail 48 or from tipping or toppling over.

Thus, the mobile carriage system provides one or more frame assemblies each of which is driven by a single drive shaft with one or more drive wheels mounted thereon, supported by one or more idler wheels, and guided by one or more guide wheels riding along a single guide track extended along a support surface to laterally move the one or more frame assemblies along the support surface. The drive wheels and one of the one or more guide wheels are connected by the single drive shaft, whereby the drive wheels are keyed to keep them locked for rotation with the drive shaft, while the one or more guide wheels have a smaller diameter and are free-floating, which allows the one or more guide wheels to move at the identical lateral pace with the drive wheels.

Changes and modifications in the specifically described embodiments may be carried out without departing from the principles of the present invention, which is intended to be limited only by the scope of the appended claims, as interpreted according to the principles of patent law including the doctrine of equivalents.

The embodiments of the invention in which an exclusive property is claimed are defined as follows:

1. A mobile carriage system comprising:
   a frame supportable on a surface;
   a drive shaft extending along said frame;
   a guide track configured for mounting to the surface, said guide track having an elevated track portion;
   a drive wheel configured to support said frame and roll along the surface, wherein said drive wheel is fixedly secured onto and rotatably driven by said drive shaft to drive said frame; and
   a guide wheel configured to ride along said elevated track portion, said guide wheel having a smaller diameter than a diameter of said drive wheel, wherein said guide wheel is mounted onto said drive shaft and is freely rotatable relative to said drive shaft.

2. The mobile carriage system of claim 1, wherein said drive wheel comprises a keyway configured for receiving a key to fixedly secure said drive wheel onto said drive shaft such that said drive wheel is rotatable only with said drive shaft.

3. The mobile carriage system of claim 1, wherein said drive wheel is spaced apart from said guide wheel along said drive shaft.

4. The mobile carriage system of claim 3, wherein said guide wheel is mounted at one end portion of said drive shaft, and wherein said drive wheel is mounted on said drive shaft away from said guide wheel and towards an opposing end of said drive shaft.

5. The mobile carriage system of claim 4, further comprising a drive system operable to rotatably drive said drive shaft, wherein said drive system is disposed at and connected to said opposing end of said drive shaft.

6. The mobile carriage system of claim 1, wherein said elevated track portion comprises an elongate rail.

7. The mobile carriage system of claim 6, wherein said guide wheel comprises a pair of radially-extending flanges defining a groove therebetween, and wherein said groove is configured to receive an upper end portion of said rail between said flanges.

8. The mobile carriage system of claim 1, wherein said frame comprises a channel member with said drive shaft extending therethrough.

9. The mobile carriage system of claim 8, wherein said guide wheel is mounted inside said channel member and said drive wheel is mounted outside said channel member.

10. The mobile carriage system of claim 1, further comprising:

an elongate retainer tab extending along said guide track adjacent said elevated track portion, said elongate retainer tab defining a retainer groove; and a tongue bracket coupled to said guide wheel;

wherein said tongue bracket is received in said retainer groove and traverses said retainer groove as said guide wheel rides along said elevated track portion, and wherein said retainer tab and said tongue bracket cooperate to prevent said guide wheel from derailing.

11. A mobile carriage system comprising:

a longitudinally extended frame supportable along a surface and adapted to move laterally along the surface;

a drive shaft longitudinally extending along said frame;

a guide track configured for mounting to the surface and having an elevated track portion, wherein said elevated track portion comprises a rail extending along said guide track;

a drive wheel configured to support said frame and roll along the surface, wherein said drive wheel is rotatably drivable by said drive shaft to move said frame along the surface; and a guide wheel configured to laterally ride along said elevated track portion, said guide wheel comprising a pair of radially-extending flanges defining a groove therebetween, and wherein said groove is configured to receive an upper end portion of said rail between said flanges, said guide wheel having a smaller diameter than a diameter of said drive wheel, and wherein said guide wheel is mounted onto said drive shaft and is freely rotatable relative to said drive shaft.

12. The mobile carriage system of claim 11, wherein said system further comprises a drive system operable to rotatably drive said drive shaft.

13. The mobile carriage system of claim 12, wherein said drive system is disposed at and connected to a first end portion of said drive shaft, wherein said guide wheel is mounted at a second end portion of said drive shaft opposite said first end portion, and wherein said drive wheel is mounted between said guide wheel and said drive system.

14. The mobile carriage system of claim 11, wherein said guide wheel rotates at a higher rotational speed than said drive wheel as said longitudinally extended frame moves laterally along the surface.

15. The mobile carriage system of claim 11, wherein said frame comprises a channel member with said drive shaft extending therethrough.

16. The mobile carriage system of claim 15, wherein said guide wheel is mounted inside said channel member and said drive wheel is mounted outside said channel member.

17. The mobile carriage system of claim 11, further comprising:

an elongate retainer tab extending along said guide track adjacent said elevated track portion, said elongate retainer tab defining a retainer groove; and a tongue bracket coupled to said guide wheel;

wherein said tongue bracket is received in said retainer groove and traverses said retainer groove as said guide wheel rides along said elevated track portion, and wherein said retainer tab and said tongue bracket cooperate to prevent said guide wheel from derailing.

18. A mobile carriage system comprising:

a frame supportable on a surface that is at a first elevation;

a drive shaft mounted to and extending along said frame;

an elongate guide track configured for mounting to the surface, said guide track having a track portion set at a second elevation that is different from the first elevation;

a drive wheel having a first diameter, said drive wheel configured to support said frame and roll along the surface, wherein said drive wheel is fixedly secured onto and rotatably driven by said drive shaft; and a guide wheel having a second diameter that is different from the first diameter of said drive wheel, wherein said guide wheel is configured to ride along said track portion;

wherein said guide wheel rotates at a different rotational speed than said drive wheel as said drive wheel rolls along the surface and said guide wheel rides along said track portion.

19. The mobile carriage system of claim 18, wherein said guide wheel is mounted to said drive shaft and is freely rotatable relative to said drive shaft.

20. The mobile carriage system of claim 19, wherein said guide wheel is mounted at one end portion of said drive shaft, and wherein said drive wheel is mounted on said drive shaft away from said guide wheel and towards an opposing end of said drive shaft.

* * * * *